United States Patent
Andreoletti

(10) Patent No.: US 9,614,357 B2
(45) Date of Patent: Apr. 4, 2017

(54) THREE-PHASE ELECTRICAL ENERGY DISTRIBUTION SYSTEM FURNISHED WITH A MEANS OF GUIDANCE OF ELECTRIC ARCS

(71) Applicant: Zodiac Aero Electric, Montreuil (FR)

(72) Inventor: Remi Andreoletti, Chelles (FR)

(73) Assignee: Zodiac Aero Electric, Montreuil (FR)

( * ) Notice: Subject to any disclaimer, the term of this patent is extended or adjusted under 35 U.S.C. 154(b) by 0 days.

(21) Appl. No.: 14/640,305

(22) Filed: Mar. 6, 2015

(65) Prior Publication Data
US 2015/0255963 A1    Sep. 10, 2015

(30) Foreign Application Priority Data

Mar. 7, 2014    (FR) .................................... 14 51860

(51) Int. Cl.
*H02B 13/025*    (2006.01)
*H02G 5/00*    (2006.01)
*H02B 1/46*    (2006.01)

(52) U.S. Cl.
CPC ............ *H02B 13/025* (2013.01); *H02B 1/46* (2013.01); *H02G 5/00* (2013.01); *H02G 5/005* (2013.01)

(58) Field of Classification Search
CPC .... H02B 13/025; H02B 13/0352; H02B 1/20; H02B 1/46; H02G 5/00; H02G 5/005; H01B 17/00; H01B 17/06
USPC ....... 361/611, 624, 637, 639, 650; 174/68.2, 174/99 B, 133 B, 149 B; 218/15, 155
See application file for complete search history.

(56) References Cited

U.S. PATENT DOCUMENTS

| | | | | |
|---|---|---|---|---|
| 2,968,781 A | * | 1/1961 | Staskowski | H02G 5/08 174/99 B |
| 3,099,504 A | * | 7/1963 | Rowe | H02G 5/06 174/99 B |
| 3,345,455 A | | 10/1967 | Goody | |
| 3,894,170 A | * | 7/1975 | Schinzel | H01R 25/14 174/99 B |
| 6,111,745 A | * | 8/2000 | Wilkie, II | H02B 1/21 174/535 |
| 2015/0047876 A1 | * | 2/2015 | De Laeter | H01B 7/08 174/119 R |

FOREIGN PATENT DOCUMENTS

| | | | | |
|---|---|---|---|---|
| DE | 1191458 | | 4/1965 | |
| DE | 1229613 | | 12/1966 | |
| DE | 4328241 | | 2/1995 | |
| FR | 1255981 A | * | 3/1961 | ............. H01R 9/226 |
| JP | 2014204632 | * | 10/2014 | ............... H02B 1/20 |

OTHER PUBLICATIONS

International Search Report and Written Opinion from French Application No. FR 1451860, issued Sep. 17, 2014, Zodiac Aero Electric, pp. 1-5.

* cited by examiner

*Primary Examiner* — Zachary M Pape
(74) *Attorney, Agent, or Firm* — Meyertons, Hood, Kivlin, Kowert & Goetzel, P.C.

(57) ABSTRACT

A three-phase electrical energy distribution system includes a set of current distribution bars extending side by side and clad with an insulator. The bars include opposing insulator-free zones. The electrical energy distribution system finds application to the three-phase electrical energy distribution systems embedded aboard an aircraft.

9 Claims, 4 Drawing Sheets

THREE-PHASE ELECTRICAL ENERGY DISTRIBUTION SYSTEM FURNISHED WITH A MEANS OF GUIDANCE OF ELECTRIC ARCS

PRIORITY CLAIM

This application claims priority to French Patent Application No. FR 1451860 filed Mar. 7, 2014, which is incorporated herein by reference in its entirety.

BACKGROUND OF THE INVENTION

1. Field of the Invention

The invention relates, generally, to three-phase electrical energy distribution systems and, in particular, electrical energy distribution systems furnished with current distribution bars. A particularly beneficial application of the invention relates to electrical energy distribution systems based on the use of current distribution bars provided in electrical energy distribution cabinets or cores of aircraft. However, the invention also applies to three-phase electrical energy distribution systems in all types of equipment, especially in batteries, converters, for example AC/DC, etc.

2. Description of the Relevant Art

As is known, an electrical energy distribution network within an aircraft has a pyramidal structure.

The electrical power is firstly produced by using part of the power provided by the engines of the aircraft to drive electrical energy generators. The electrical energy generated is provided to distribution cabinets, also referred to as distribution "cores", so as thereafter to be redistributed either to loads, or to secondary distribution boxes, with different amperages. Three-phase electrical distribution bars, also known as "busbars", are used to convey the currents within the distribution cabinet. The powers conveyed within the cabinet are relatively significant. They can reach values of the order of a megawatt.

The cross-section of the distribution bars determines the maximum current which can flow safely in the bars.

Each primary or secondary distribution cabinet integrates distribution components, the function of some of which is to switch the energy to a primary distribution bar, as is the case for the line contactors, to electrical loads aboard the aircraft or else to secondary distribution sub-networks which again redistribute the energy to loads of lesser power. The function of other distribution components is to protect the network in case especially of electrical faults, such as a short-circuit.

Systematically, each cable which exits a distribution cabinet in order to distribute the electrical energy is protected either by a breaker, or by a fuse, or by a contactor-breaker. The operation of these components is triggered on the basis of an overload of current. The triggering time is inversely proportional to the overload current.

The switching element furthest upstream, that is to say closest to the electrical source, consists of the line contactor. The protection furthest upstream of the electrical network is consequently that which commands the generator and controls the line contactor. This protection is based on a measurement of the current so as to identify an overload and to isolate the fault if no other downstream protection has been able to do so, consequently proving that the fault is situated at the level of the primary network, between the line contactor and the protection devices situated downstream. The protection provided at the level of the primary network can only be triggered after a sufficient duration so that the protections situated downstream can operate in the case where the fault were to be situated at their level. Today, this duration of triggering may be a maximum of 5 seconds, this being sufficiently long to cause damage.

Thus, the protection provided at the level of the generator and of the line contactor is the longest to be implemented. Therefore, a fault occurring directly downstream, on the primary network, could, having regard to the triggering time of this protection, cause damage before being isolated.

It will be noted moreover that the set of protection devices provided in primary or secondary distribution cabinets do not make it possible to ensure protection against all types of faults liable to be encountered in an electrical core.

Although they are effective for covering faults such as over-currents or short-circuits, certain types of short-circuits are however not covered by these protections.

For example, metallic objects (screwdrivers, nuts, etc.) left by error in an electrical cabinet during a maintenance operation, are liable to cause short-circuits when they come into contact with the electrical distribution bars. Such short-circuits will not be seen by the primary network protection devices and are liable to cause the occurrence of electric arcs liable to propagate along the distribution bars and to cause significant damage liable to compromise the safety of the aircraft.

The destructive effect of an arc occurs, however, only when the arc is slowed. In this case, it eats away the metal of the distribution bars, projecting molten metal around it. Such is also the case when it encounters an obstacle, be it metallic or insulating.

It has indeed been noted that an electric arc which propagates over distribution bars is generally of the order of 2 to 3 cm high, for values of current, frequency and voltage in the aeronautics sector. This is the reason why it is necessary to provide a safety zone of about 3 to 4 cm around the distribution bars in the distribution cabinets so as to prevent an electric arc which propagates on the bars from attaching onto a metallic element of the cabinet, which may turn out to be constraining.

SUMMARY OF THE INVENTION

In view of the foregoing, a three-phase electrical energy distribution system capable of imposing a trajectory on the arc, once created, and of modifying its shape so as, especially, to confine it in a restricted volume is described.

In one embodiment, a three-phase electrical energy distribution system includes a set of current distribution bars extending side by side and clad with an insulator, in which the bars include opposing insulator-free zones.

It has been noted that by providing spare insulator-free zones in the current distribution bars, arc guidance zones are created locally making it possible furthermore to limit the effect of the electric arcs laterally and vertically by confining them between the bars.

Indeed, in diverse embodiments, the pattern of the insulator-free zones is adapted so that the said zones constitute means of guidance of an electric arc liable to propagate along the bars. For example, the insulator-free zones form electrically conducting longitudinal bands.

In one embodiment, the system includes three three-phase electrical energy distribution bars extending side by side, the middle bar including lateral faces turned towards the lateral bars each including at least one insulator-free zone and the lateral face of the lateral bars that are turned towards the middle bar including at least one corresponding insulator-free zone.

In another embodiment, a system for trapping electric arcs propagating over a three-phase electrical energy distribution system such as defined hereinabove, include an enclosure internally delimiting a trapping cavity and comprising an anterior face through which an arc propagating in the distribution bars along the opposing insulator-free zones is introduced into the cavity, a peripheral wall and a posterior wall furnished with passages for the distribution bars.

BRIEF DESCRIPTION OF THE DRAWINGS

Other aims, characteristics and advantages of the invention will become apparent on reading the following description, given solely by way of nonlimiting example and with reference to the appended drawings in which.

Figure 1:
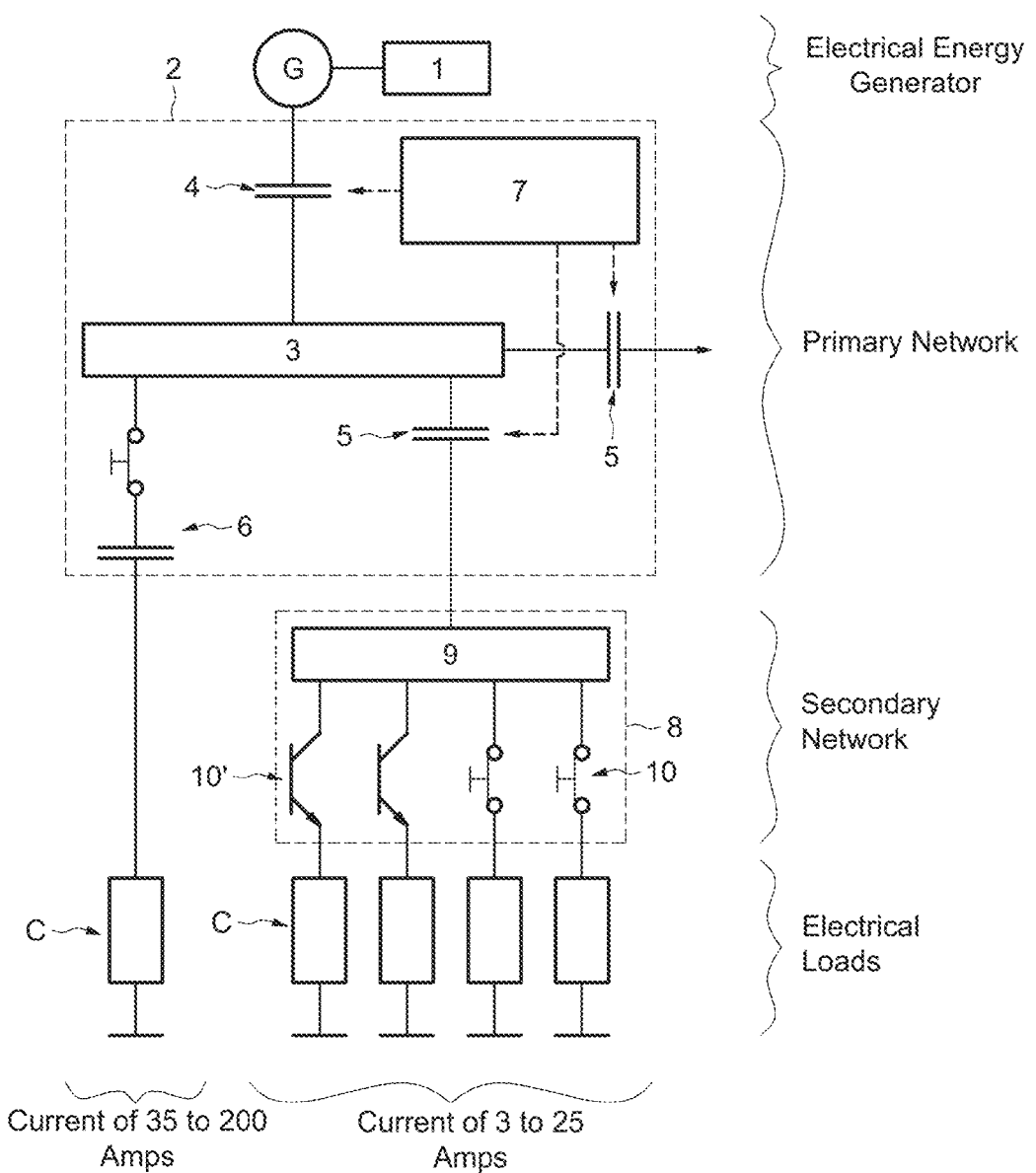
FIG. 1 illustrates the general architecture of an electrical energy distribution network embedded aboard an aircraft.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Reference will be made firstly to FIG. 1 which illustrates the general architecture of an electrical energy distribution network for aircraft.

The network comprises firstly an electrical energy generation stage comprising a generator G, associated with a controller 1, which uses a part of the power provided by the engines of the aircraft to deliver electrical energy, which is delivered to a primary network, to a secondary network and to electrical loads.

The primary network essentially comprises a distribution cabinet or core 2 in which are provided three-phase current distribution bars 3 which receive the electrical energy delivered by the generator by way of a lines contactor 4 and which redistribute the electrical energy to another primary network or to the secondary network or else directly to the loads by way of respective contactors 5 or of a contactor-breaker 6 controlled by a contactors command device 7.

The secondary network, for its part, also comprises a secondary distribution cabinet 8 also comprising three-phase current distribution bars 9 supplying the loads C directly by way of contactors 10 or switches 10'. For example, and as illustrated in FIG. 1, loads supplied at currents of between 35 and 200 amperes are supplied directly by the primary distribution cabinet 2, while electrical loads C supplied by currents of between 3 and 25 amperes are linked to the secondary distribution cabinet 8.

Indicated previously, it may happen that metallic objects left by error in a distribution cabinet, and in particular in the primary distribution cabinet 2, come into contact with the primary distribution bars and thereby generate short-circuits which are not detected and taken into account by the primary network protection devices.

Such short-circuits are liable to cause electric arcs which propagate in the distribution bars and in the distribution cabinet and cause relatively significant damage.

Figure 2:
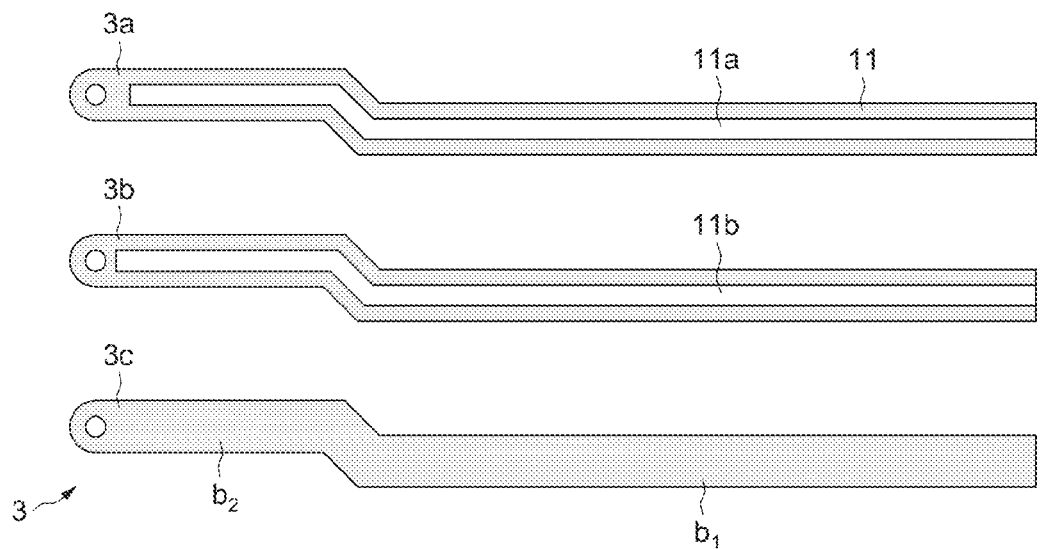
FIG. 2 is a lateral view showing one of the faces of the distribution bars of an electrical energy distribution system.
Figure 3:
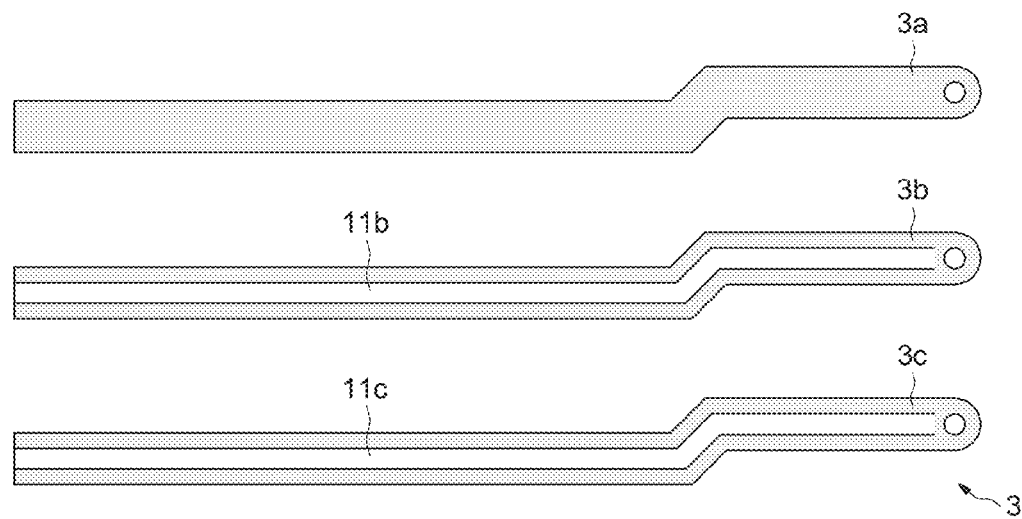
FIG. 3 is a lateral view of the other face of the current distribution bars.

Referring to FIGS. 2 and 3, a current distribution bar is made from an electrically conducting material, especially metal. For the distribution of three-phase electrical energy, use is made of three current distribution bars 3a, 3b and 3c disposed side by side, namely two lateral bars 3a and 3c and a middle bar 3b.

For example, each bar comprises a first branch b1, ensuring the actual electrical conduction of the current, and a second branch b2 here offset axially with respect to the first branch and ensuring the electrical conduction of the current as well as the mechanical fixing of the bar.

It is moreover seen in FIGS. 2 and 3 that each bar 3a, 3b and 3c is clad with an insulator 11. This is advantageously a nonorganic insulator, for example the insulator marketed under the name Interpon®, Rilsan®, or a nylon insulator.

The insulator 11 extends along the first branch b1 and the second branch b2.

However, these branches b1 and b2 comprise an insulator-free zone 11-a, 11-b and 11-c provided on the opposing faces of the bars 3a, 3b and 3c.

Thus, the face of the lateral bars 3a and 3c that is turned towards the middle bar 3b comprises an insulator-free zone 11a and 11c while the mutually opposite faces of the middle bar 3b are each furnished with an insulator-free zone 11b.

In the exemplary embodiment illustrated in FIGS. 2 and 3, the insulator-free zones 11a, 11b and 11 c are made in the form of a longitudinal band delimiting an electrically conducting rail in the bars.

Thus, an arc created in an electrical energy distribution system is able to propagate only to the site of the insulator-free electrically conducting zones and is unable to propagate in the insulated zones.

The electric arc is hence localized and confined in inter-bar zones.

Figure 4A:
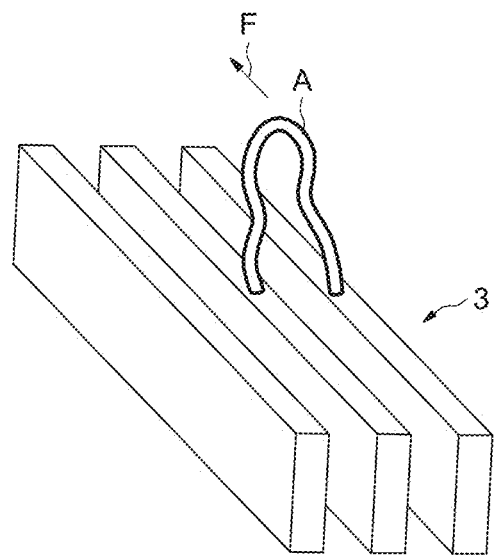
FIGS. 4A and 4B show the propagation of an arc over uninsulated current distribution bars and those according to the embodiments, respectively.

Referring to FIG. 4A, an electric arc which propagates along an uninsulated distribution bar follows Laplace's law and hence moves solely in the direction of propagation of the charges (arrow F). In uninsulated distribution bars, it is seen in FIG. 4A that the electric arc A has an inverted U shape and propagates more particularly above the bars. The electric arc A which propagates proud is able to reach metallic zones of the electrical distribution core.

Figure 4B:
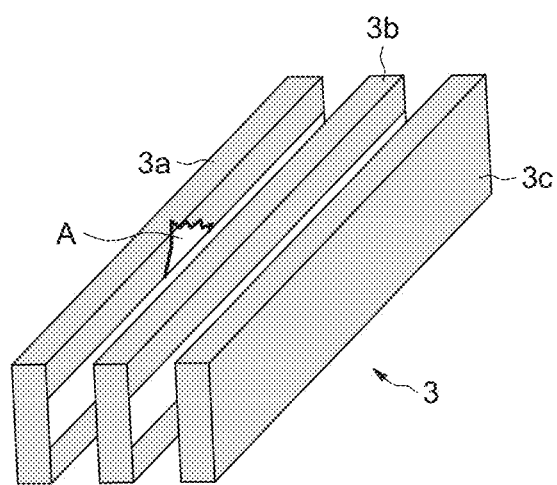

Conversely, referring to FIG. 4B, by providing electrically conducting zones along the central zone of the distribution bars, the arcs are channelled between the distribution bars, the arc adopting a sphere shape which is localized in the central zone of the distribution bars and which can no longer attach onto any metallic element in proximity.

As indicated previously, it has in this regard been noted that aboard an aircraft and in particular for values of current that are encountered aboard the aircraft, the height of an electric arc propagating along uninsulated bars is of the order of 2-3 cm. Conversely, for insulated distribution bars furnished, however, with insulator-free zones and having a height of 15 mm, the spherical arc does not stand proud of the bars or stands proud above the bars by only a few millimeters, hence limiting the risks of the arc coming into contact with metallic elements of the electrical distribution core.

It will be noted moreover that when the electric arc encounters an obstacle, its behaviour between the bars causes them to be eaten away, until they are severed, hence thereby ensuring the fuse function.

By confining the electric arcs between the bars, the cross-section of the current distribution bars is sharp and the projection of molten metal is limited.

Thus, by virtue of the embodiments described herein, it is possible for the metallic elements of the distribution core to be brought close to the distribution bars without running the risk of an arc coming into contact with these metallic zones when the arc moves or when the latter is stopped by an obstacle.

In the exemplary embodiment which has just been described, the conducting zones of the distribution bars are made in the form of electrically conducting longitudinal bands.

It would also be possible, as a variant, to provide electrically conducting zones of any other shape, for example chessboard-like or locally interrupted by providing insulating inserts so as to provide for a weakening of the arc as it moves along the bars.

It will be noted moreover that the embodiments which have just been described, which provides rails for propagating the arcs along the bars, is particularly adapted for guiding the arcs towards devices for trapping electric arcs.

Figure 5:
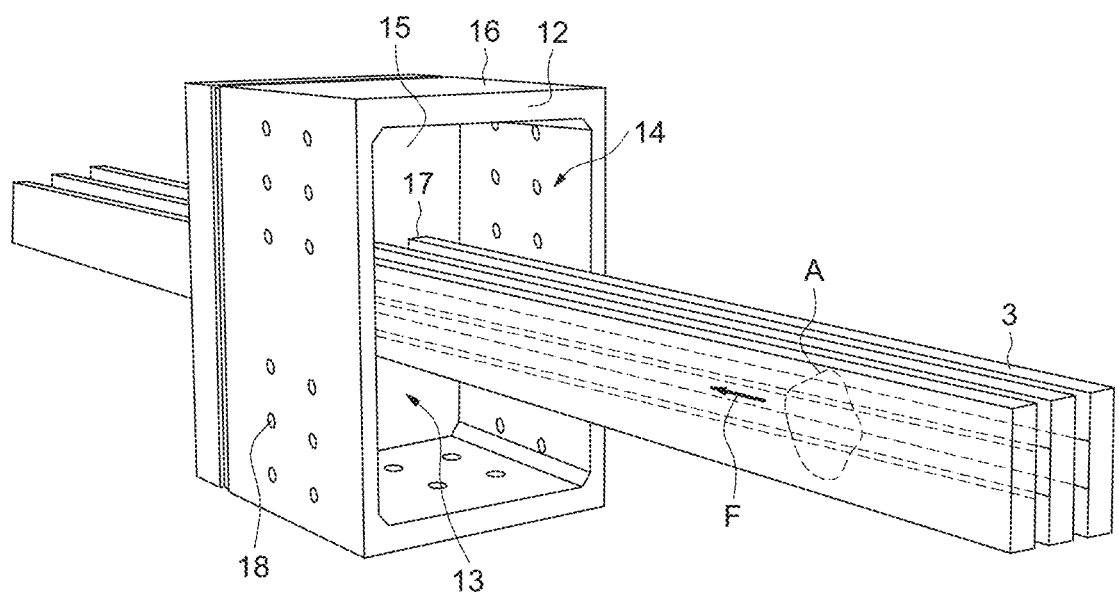
FIG. 5 is a view of a system for trapping electric arcs.

A trapping device making it possible to block and smother the arcs, while preventing their propagation, has been represented in FIG. 5.

As seen in FIG. 5, such a trapping device comprises an enclosure 12 traversed by the current distribution bars, here the primary distribution bars 3.

Internally the enclosure 12 delimits a cavity 13 for trapping the electric arcs A.

By considering the direction of propagation of the electric arcs between the bars 3 (Arrow F), which follow Laplace's law and which hence move solely in the direction of propagation of the charges, the enclosure 12 comprises an open anterior face 14 by which the arc A penetrates into the cavity 13, a posterior wall 15 opposite to the anterior face 14, and a peripheral wall 16.

The enclosure 12 is traversed by the three-phase bars 3. Thus, the posterior wall 15 is furnished with three passages such as 17 for the bars 3.

It is seen moreover in FIG. 5 that here the enclosure 12 has a parallelepipedal general shape. Of course, other shapes can be envisaged without departing from the scope of the invention. Thus, here the posterior back wall 15 is rectangular, the peripheral wall 16 being formed by a set of four sides extending axially from the peripheral back wall 15. The whole is made in one piece, from an insulating non-metallic material, for example epoxy resin.

Thus, when the electric arc, which is confined in the zone situated between the bars and which can propagate only in the direction of movement of the charges along the bars 3, reaches the cavity 13, it comes into contact with the posterior back wall 15 of the cavity, without being able to retreat or escape through the peripheral lateral walls.

As seen, the enclosure is drilled with a set of holes, such as 18, made for example in the peripheral wall 16 and/or in the posterior wall 15 so as to ensure progressive evacuation of the plasma without leading to its recomposition.

Such holes 18 are optional in particular when the insulator-free zones are configured to weaken the arc. Their presence remains advantageous for obtaining a smothering of the arc. Although such holes can be made either on the peripheral wall, or on the posterior wall of the enclosure, or on the peripheral wall and on the posterior wall 15, making them in the posterior wall is advantageous in so far as the pressure of the gas is more significant in this zone.

It will be noted moreover that the diameter of the holes 18 must be chosen so as to allow progressive evacuation of the plasma, while avoiding its recomposition outside.

A diameter of holes 18 of between 2 mm and 3 mm will be chosen for example. Provision may also be made to space them by a distance of between 5 and 6 mm, for example for 3 mm holes.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A three-phase electrical energy distribution system, comprising: a set of current distribution bars extending side by side and clad with an insulator, wherein the bars comprise opposing insulator-free zones; and an enclosure internally delimiting a trapping cavity and comprising: an anterior face through which an arc propagating in the distribution bars and guided along the opposing insulator-free zones is introduced into the cavity; a peripheral wall; and a posterior wall furnished with passages for the distribution bars; and wherein the anterior face of said enclosure is opened to receive an arc propagating in the distribution bars, the posterior wall of said enclosure is closed and only furnished with the passages for the current distribution bars, and the peripheral wall of said enclosure is formed by a set of four sides extending axially from the posterior wall and surrounds a part of said current distribution bars.

2. The system according to claim 1, wherein a pattern of the insulator-free zones is adapted so that the said zones constitute means of guidance of an electric arc liable to propagate along the bars.

3. The system according to claim 2, wherein the insulator-free zones form electrically conducting longitudinal bands.

4. The system according to claim 2, wherein the current distribution bars comprise three current distribution bars extending side by side, wherein the three current distribution bars include two lateral bars and a middle bar between the two lateral bars, wherein the middle bar comprises lateral faces turned towards the lateral bars each lateral face comprising at least one insulator-free zone, and wherein lateral faces of the lateral bars, that are turned towards the middle bar, have at least one corresponding insulator-free zone.

5. The system according to claim 1, wherein the insulator-free zones form electrically conducting longitudinal bands.

6. The system according to claim 5, wherein the current distribution bars comprise three current distribution bars extending side by side, wherein the three current distribution bars include two lateral bars and a middle bar between the two lateral bars, wherein the middle bar comprises lateral faces turned towards the lateral bars each lateral face comprising at least one insulator-free zone, and wherein lateral faces of the lateral bars, that are turned towards the middle bar, have at least one corresponding insulator-free zone.

7. The system according to claim 1, wherein the current distribution bars comprise three current distribution bars extending side by side, wherein the three current distribution bars include two lateral bars and a middle bar between the two lateral bars, wherein the middle bar comprises lateral faces turned towards the lateral bars each lateral face comprising at least one insulator-free zone, and wherein lateral faces of the lateral bars, that are turned towards the middle bar, have at least one corresponding insulator-free zone.

8. The system according to claim 1, wherein the peripheral wall is drilled with a set of holes configured to ensure progressive evacuation of the plasma without leading to its recomposition.

9. The system according to claim 1, wherein the enclosure is made in one piece from an insulating non-metallic material.

* * * * *